Figure 1:
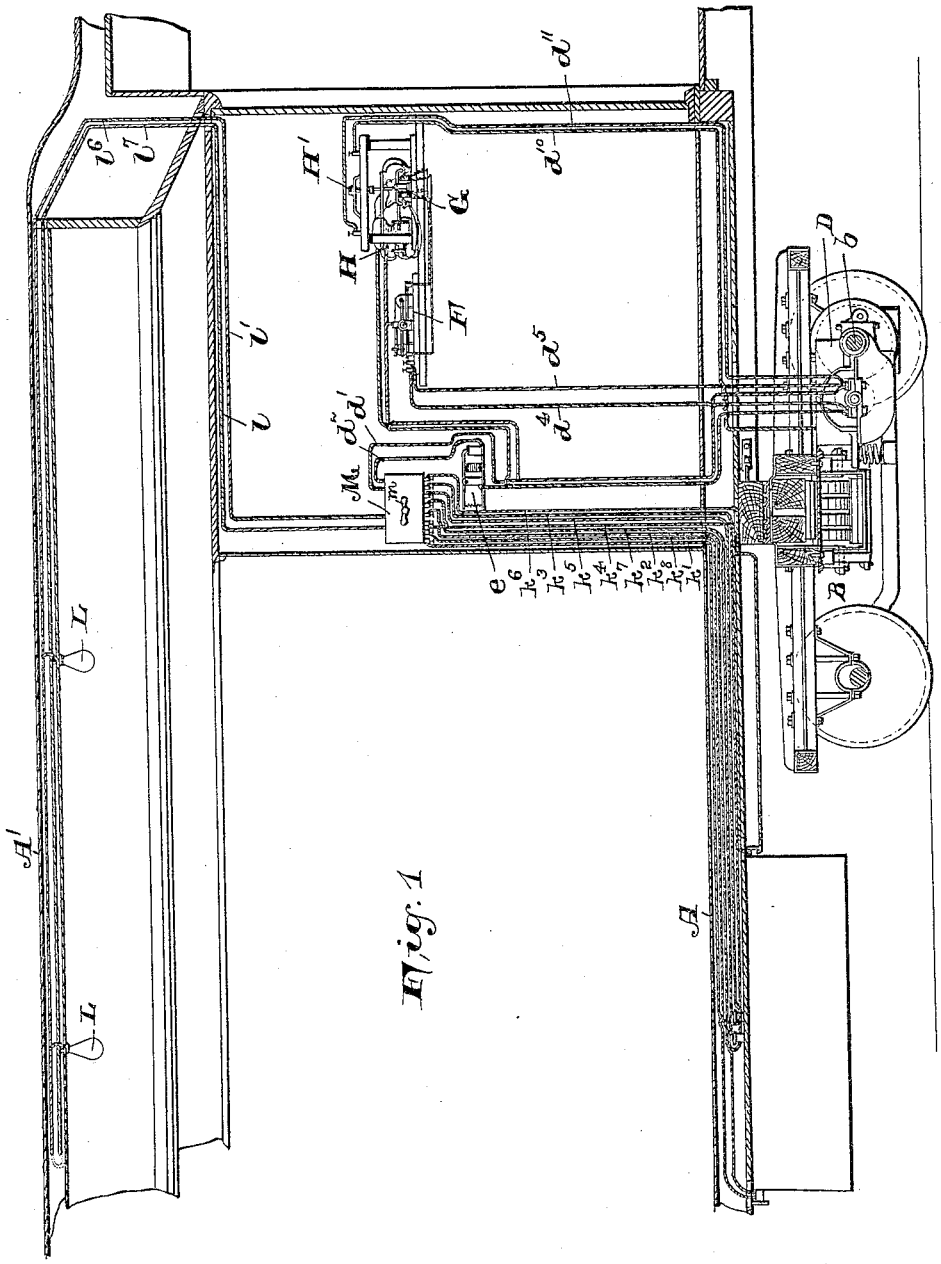

(No Model.) 5 Sheets—Sheet 3.
M. MOSKOWITZ.
SYSTEM OF LIGHTING AND HEATING CARS BY ELECTRICITY.

No. 525,992. Patented Sept. 11, 1894.

WITNESSES: INVENTOR:
Morris Moskowitz
BY Fred C. Fraentzel, ATT'Y.

(No Model.) 5 Sheets—Sheet 4.
M. MOSKOWITZ.
SYSTEM OF LIGHTING AND HEATING CARS BY ELECTRICITY.
No. 525,992. Patented Sept. 11, 1894.
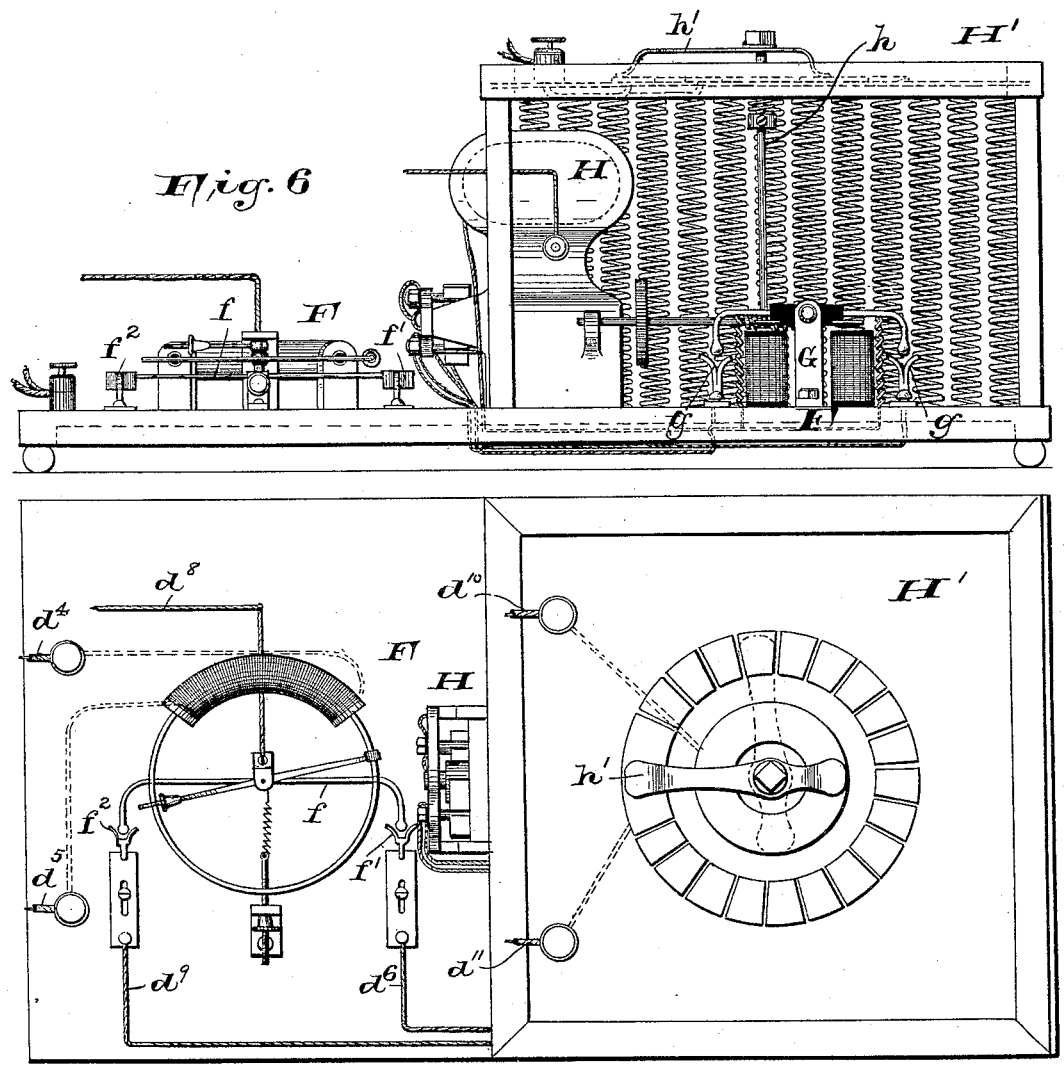
WITNESSES: INVENTOR:
Morris Moskowitz,
BY Fred H. Fraentzel, ATT'Y.

(No Model.) 5 Sheets—Sheet 5.

M. MOSKOWITZ.
SYSTEM OF LIGHTING AND HEATING CARS BY ELECTRICITY.

No. 525,992. Patented Sept. 11, 1894.

WITNESSES: Wm H Canfield Jr. H W Marsh

INVENTOR: Morris Moskowitz,
BY Fred C. Fraentzel, ATT'Y.

UNITED STATES PATENT OFFICE.

MORRIS MOSKOWITZ, OF NEWARK, NEW JERSEY, ASSIGNOR, BY DIRECT AND MESNE ASSIGNMENTS, TO THE NATIONAL ELECTRIC CAR LIGHTING COMPANY.

SYSTEM OF LIGHTING AND HEATING CARS BY ELECTRICITY.

SPECIFICATION forming part of Letters Patent No. 525,992, dated September 11, 1894.

Application filed March 31, 1894. Serial No. 505,821. (No model.)

*To all whom it may concern:*

Be it known that I, MORRIS MOSKOWITZ, a citizen of the United States, residing at Newark, in the county of Essex and State of New Jersey, have invented certain new and useful Improvements in Systems of Lighting, Heating, &c., Cars by Electricity; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

My invention relates to systems of car lighting, heating, &c., where electricity is employed as the lighting or heating agent, and is designed for use with a dynamo or dynamos placed on a swiveling truck carrying the car, (the dynamo being usually swung or pivotally arranged on the car-wheel axle,) and driven by the power derived from said car-wheel axle.

The invention is further designed to provide a simple and effective contrivance or apparatus, from which a constant voltage or out-put will be the result, irrespective of the speed of the dynamo; and the invention therefore consists in the arrangement and combination of a working or main circuit containing lamps or other translating devices, of a storage battery or batteries, (there being preferably two batteries or sets of batteries in the main circuit, connected with a switch, whereby, one battery is directly connected with the dynamo, and is being charged thereby, while the other battery has no connection with the dynamo and is directly in the lamp circuit,) and a self-regulating dynamo in said main or working circuit, the field magnet of said dynamo being in an independent circuit, and having electric regulating devices therein, causing the dynamo to deliver a constant potential irrespective of the armature speed—that is to say, that the current is caused to become weaker or stronger, as the case may be, while circulating around the field magnet, in proportion to the increase or decrease of the armature speed.

The invention therefore consists, generally, in the organization of the following systems of apparatus and circuits, and combining in one or more instruments all or any of the specific features as may be desired for the particular purpose, embracing, first, a dynamo on a swiveling truck, in main or working circuit; secondly, the dynamo and an automatic pole-changer in said main circuit, whereby provision is made for the reversal or the rotation of the armature when the car reverses its direction of travel, the object being to prevent the reversal of the electric current to the main circuit from the dynamo; thirdly, the arrangement of a double set of storage batteries, one set of which is being charged from the dynamo, while the other set is feeding the lamp circuit, and vice versa; fourthly, the dynamo and an independent circuit connected with one armature brush and the field of the dynamo, and regulating devices in said circuit, to secure a self-regulating dynamo and a constant voltage therefrom irrespective of the speed; and lastly the invention further consists in details of construction and combinations of parts, (such as mounting the dynamo on the car-wheel axle and the gear-mechanism connected therewith and with said axle,) to be hereinafter more specifically set forth and finally embodied in the clauses of the claim.

Heretofore, special devices have been employed for compensating for the relative movement between the car-wheel axle and the spring-supported car-body on the usual form of swiveling truck, in order to maintain a proper power connection between the dynamo and the car-axle, or, in other cases, the dynamo has been mounted on the cross-beams attached to the equalizing bars of the truck and then geared with the car-wheel axle. All these arrangements have been found unsatisfactory and unreliable in that they get out of order and that, owing to the variations in height between the parts of the truck frame and the car-wheel axle, the gear wheels would become disengaged and the gear teeth are too often snapped. To overcome these objections, I have mounted the dynamo on the car-wheel axle and have geared its armature shaft directly with a gear wheel on said car-wheel axle. Thus it will be evident, that no matter what are the relative positions, due to various weights in the car, between the car-wheel axle and the truck frame, the dynamo and the gear connected therewith can not be effected thereby.

The invention is illustrated in the accompanying drawings, in which—

Figure 2:
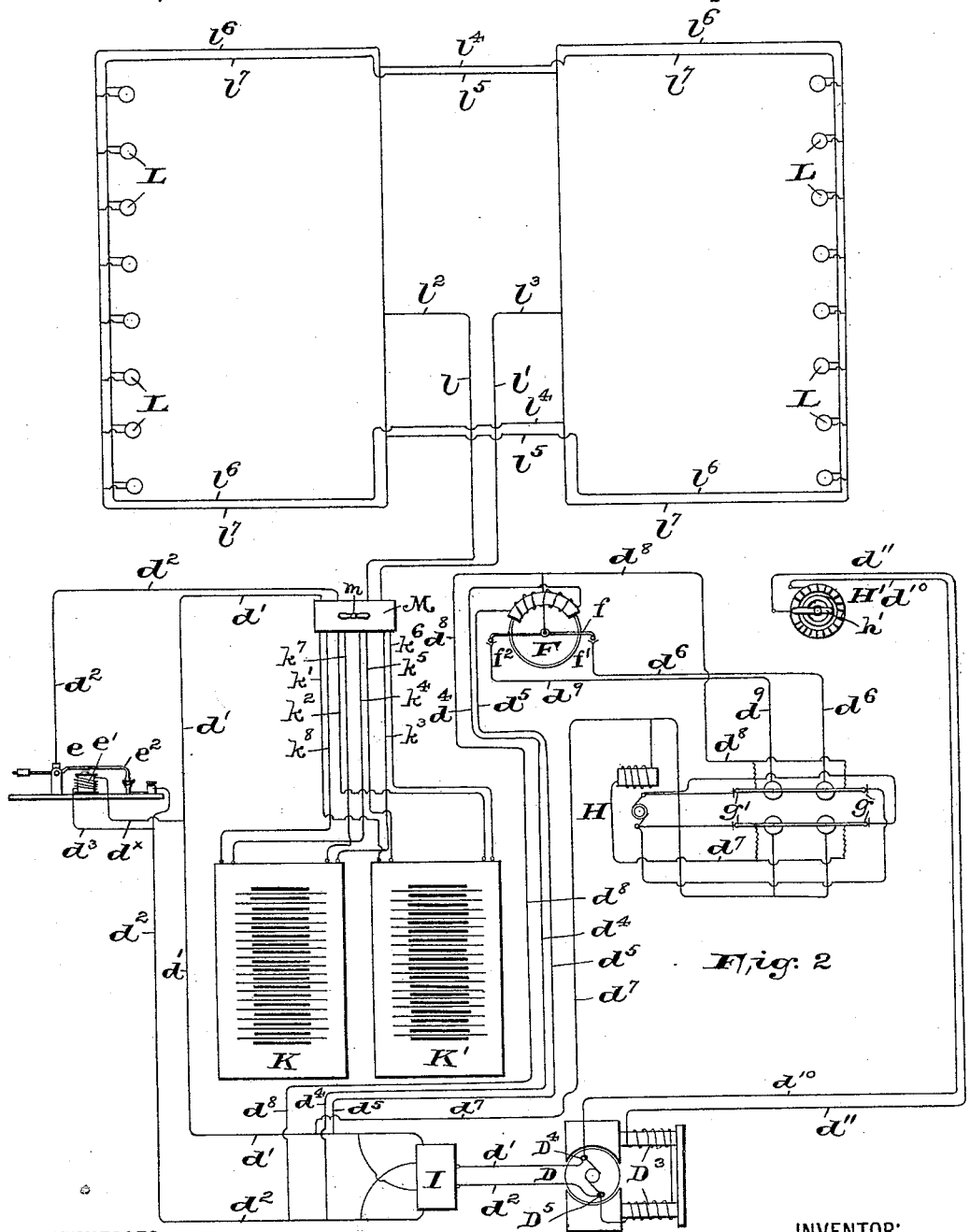
Figure 3:
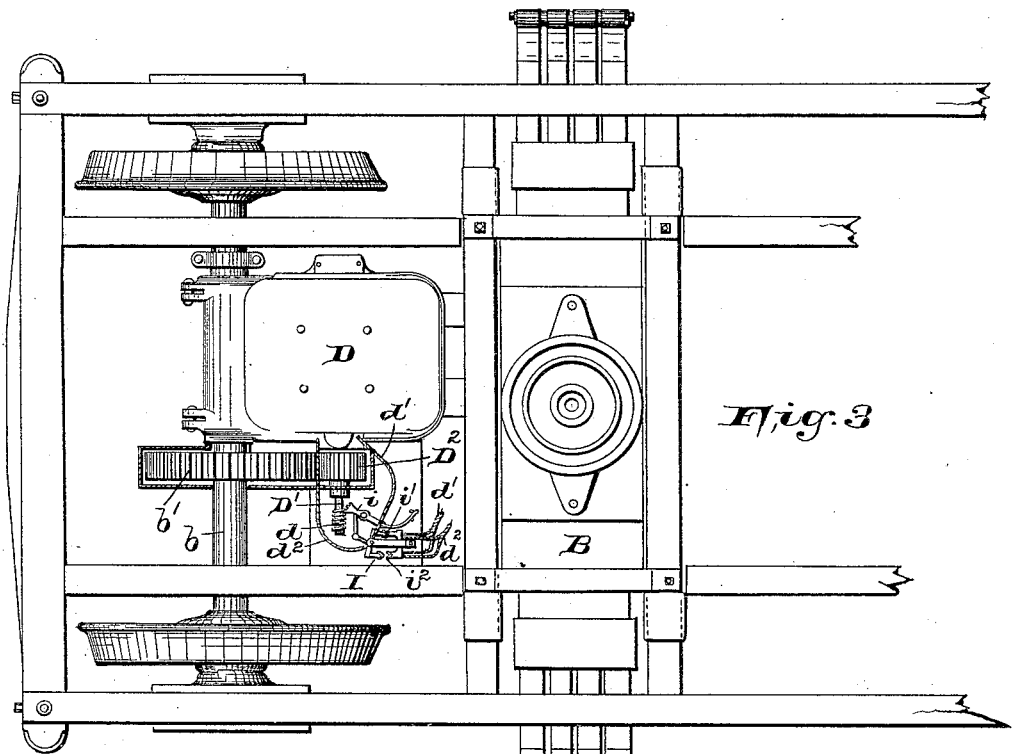
Figure 4:
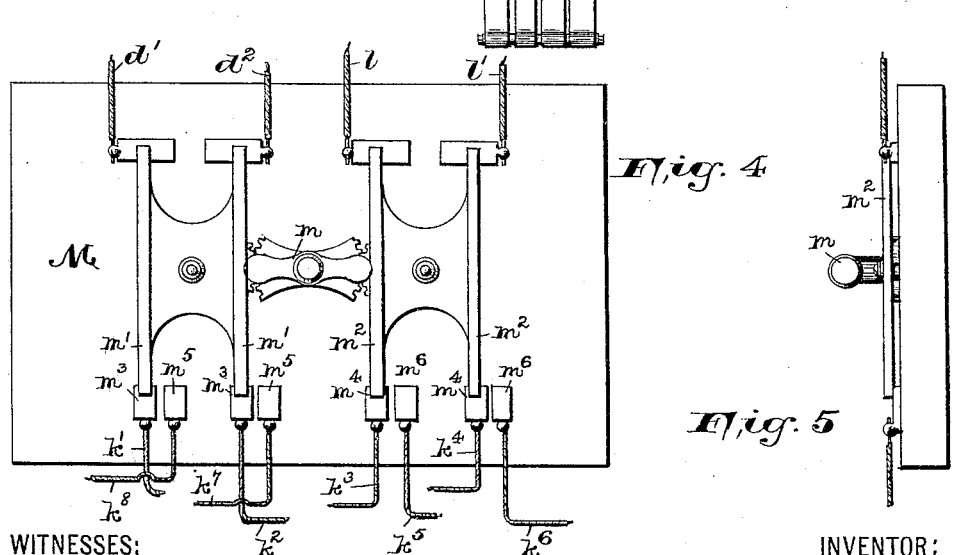
Figure 5:
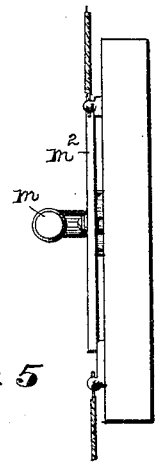
Figure 8:
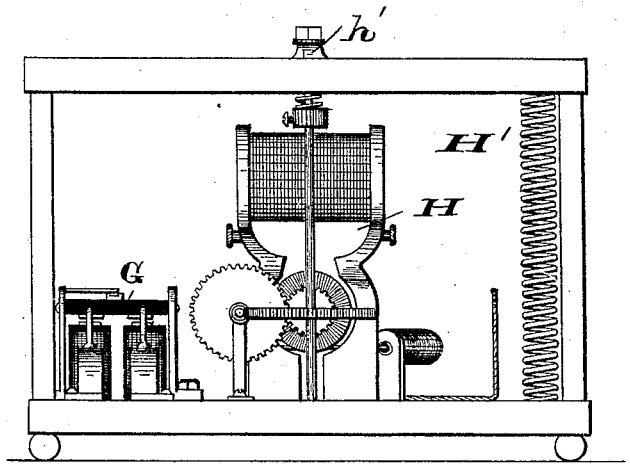
Figure 9:
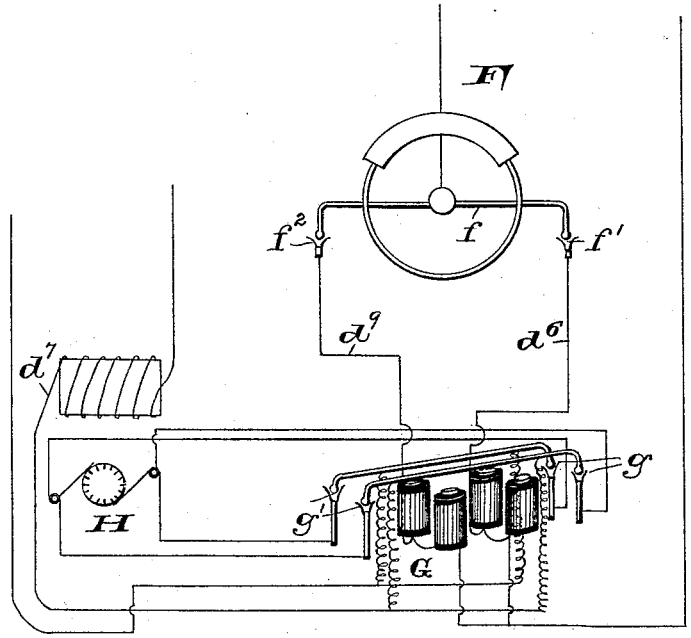

Figure 1 is a vertical section through the car, and car-wheel axle, illustrating the general arrangement of the electrical circuits and operating mechanism embodying the principles of my invention. Fig. 2 is a diagrammatic view to more clearly illustrate the arrangement of all electrical circuits and operating mechanism. Fig. 3 is a plan view of the car truck, illustrating the dynamo mounted on the car-wheel axle, and a pole-changer connected therewith and operated from the armature shaft. Fig. 4 is a plan view of an electric switch used in the main or working circuit, and Fig. 5 is a side view of the same. Fig. 6 is a side view of the pressure regulator for varying the strength of the field magnet of the dynamo. Fig. 7 is a plan view of the same; and Fig. 8 is a side view of said instrument. Fig. 9 is a diagrammatic view of the electrical circuits and the operating and regulating devices embodied in said instrument illustrated in said Figs. 6 and 7.

In said drawings, A is the floor of a railway car and A′ the roof.

B is the car truck and $b$ is the car-wheel axle.

D is the dynamo which supplies the electrical energy for operating the lamps and other devices in the car. Said dynamo D, which is of any suitable construction, is pivotally mounted on the car-wheel axle $b$, in any well known manner. On its armature shaft D′ I have arranged a pinion or toothed wheel $D^2$ which meshes with a gear wheel $b'$ on the car-wheel axle $b$. The dynamo, as well as the driving gear, is preferably incased in a suitable housing, as illustrated in Figs. 1 and 3, to protect the parts from dirt and stones. Furthermore, the dynamo itself is one, in which the armature rotates sometimes in one direction and at other times in the opposite direction, which depends entirely on the forward or backward movement of the train.

It is well known in train lighting, that the dynamo is operated by a power at a varying speed, and consequently the voltage or output of the dynamo of ordinary construction, will rise with the speed of the rotation of the dynamo-armature, and it is therefore necessary to secure a constant voltage or out-put of electro-motive force irrespective of the speed.

I will first describe the manner of carrying out the first part of my invention, that is, of varying the strength of the field magnet automatically and instantly, in proportion to the increase or decrease of the armature speed.

In Fig. 2, $D^3$ indicates the field magnet coil which is supplied with current by the rotation of the armature of the dynamo, as will be understood. $D^4$ and $D^5$ are the respective brushes of the dynamo, from which extend the circuit wires $d'$ and $d^2$ of the main or working circuit. In one of said wires, as $d^2$, is a suitable make and break switch $e$, the electro-magnet $e'$ of which is connected with a short circuit wire $d^3$ and $d^\times$ which terminates in the main circuit wire $d'$ and $d^2$. In this manner, the dynamo going at a slow speed sufficiently energizes the said magnet $e'$ to cause it to attract the arm $e^2$ and establish a complete circuit through the main circuit wires, when the dynamo speed has increased the desired number of revolutions, and thereby switching in the storage battery to be charged. Extending from the main circuit wires $d$ and $d^2$ are the wires $d^4$ and $d^5$ respectively and in circuit with the same is a suitable volt meter or regulator F. Said regulator is clearly illustrated in Figs. 6 and 7. Suffice it to say, however, that as the speed and hence the electro-motive force of the dynamo D increases above a predetermined number of revolutions, a pivoted arm $f$ in said device F makes contact at $f'$ and the current passes through the wire $d^6$, causing the relay G to make contact at $g$, causing a small motor or rotary magnet H in the device illustrated in said Figs. 6 and 7 to rotate in one direction, and by its intermediately arranged operating mechanism, rotating a verticle spindle $h$ and thereby throwing in, automatically, the desired resistance. The rheostat H′, by means of the circuit wires $d^{10}$ and $d^{11}$ connected with the brush $D^4$ and the field-magnet coil $D^3$ respectively, thus decreases the electro-motive force in the field coils of the dynamo in proportion to the speed of the armature shaft and the resistance cut in, and the result is that the output of the electro-motive force from the dynamo into the main circuit is equalized or maintained constant. The small motor, employed to operate the rheostat arm $h'$ is in the circuit $d^7$ and $d^8$ connected directly with the main circuit wire $d'$, and with the wire $d^2$ by means of the make and break switch $e$, as will be clearly seen from Fig. 2. When the contact has become broken at $f'$, as the current has weakened, the lever or arm $f$ in the volt-meter or regulator F returns to its normal position, and if contact is made at $f^2$, then the current passes through the wire $d^9$ causing the relay G to make contact at $g'$, thus changing the polarity of the small motor H, reversing the direction of the revolutions of its armature shaft and hence rotating the spindle $h$ in the opposite direction. This, as will be understood, will again cut out the resistance coils in the rheostat H′. Thus it will be seen, that in its normal condition, when the dynamo is rotating at a predetermined speed, there will be no interruption of the current in its passage from one of the brushes of the dynamo to the field, the current simply passing through the wires $d^{10}$ and $d^{11}$ and through the rheostat without obstruction; but as soon as the first resistance coil is introduced, as the speed of the dynamo increases above said predetermined speed, then there is a corresponding decrease of the electro-motive force in the field coils of the dynamo and the result is a decrease in the magnetic induction in the field itself, which tends and does equalize the electro-motive force of the dynamo.

The manner of arranging the circuits and devices just described will be clearly seen from an inspection of Figs. 1 and 9, but this may be departed from without materially altering the scope of my present invention.

I will now describe the general arrangement of the main or working circuit and the several operating devices and instruments arranged in said circuit. Of course it will be understood that the armature shaft of the dynamo is necessarily subject to reversal, according to the direction in which the car is moving. I have therefore arranged in the main circuit wires $d'$ and $d^2$ a suitable switch, known as a pole-changer. Said switch, as will be seen from Fig. 3, is provided with a spring-actuated arm $i$ having a toothed end which is adapted to mesh with a worm gear $d$ on the armature shaft $D'$ of the dynamo. According to the direction of rotation of said shaft $D'$, said switch I makes contact at $i'$ or $i^2$ and the polarity is changed, being immediately responsive to the change in the direction of the armature current. Said pole-changer may be of any well known form and construction, and may be mechanically operated, as in the present case, or it may be electrically operated, as will be evident. When the dynamo D is running at the proper speed and contact has been established in the contact making and breaking switch $e$, the current is fed into either one of the storage batteries K or K' and thence to the lamp circuit $l$ and $l'$ in the car. Arranged in the main circuit $d'$—$d^2$ and the circuit $l$—$l'$ is a regulator or switch M, whereby the battery K is put in circuit with the dynamo D and becomes charged, while, owing to the general construction of said switch M, which is more clearly illustrated in Figs. 4 and 5, the other battery K', which has been previously stored with electricity, is cut out of circuit with the dynamo but is in direct circuit with the lamps L in the car. The advantage obtained by this arrangement is that the lamps are always fed from a charged battery or set of batteries, not in circuit with the dynamo, and the lights will therefore burn steady and are not subject to any possible fluctuations due to any slight increase or decrease of the voltage or out-put from the dynamo. While these slight fluctuations are of no harm to the storage battery, still, if the battery is fed at the same time that it furnishes current to the lamps, the slightest fluctuations will be perceptible in the light of the lamps. By means of the handle $m$, the contact can be changed between the arms $m'$ and $m^2$ with the contact plates $m^3$ and $m^4$ to plates $m^5$ and $m^6$, see Fig. 4, and either battery can be put in circuit with the dynamo, as may be desired. Thus, while the battery K is being stored with electricity, battery K' gives it out, and vice versa. When the battery K' is run down, it can be stored with a fresh supply of electricity, and the lamp circuit is fed from the other battery K. The method of wiring the plates $m^3$—$m^4$, and $m^5$—$m^6$, will be seen from Figs. 2 and 4. As shown, the wires $k'$ and $k^2$ are in circuit with $d'$—$d^2$ and feed the battery K', while the wires $k^3$ and $k^4$ are in circuit with the lamp circuit $l$—$l'$ and feed from the battery K. When the handle $m$ is turned, then the wires $k^5$ and $k^6$ will feed the circuit $l$—$l'$ from battery K' and wires $k^7$ and $k^8$ will be in circuit with the circuit wires $d'$—$d^2$ and the dynamo will feed the battery K.

The mechanical and electrical constructions of the pole-changer I, the switch M and the several devices comprising the dynamo-regulator, illustrated in Figs. 6, 7 and 8, will not be particularly described and specified in the present application, as it is not deemed necessary to a clear understanding of the present invention, it being my intention to protect the general construction and arrangement of the parts embodied in said apparatus and instruments by separate applications for Letters Patent.

In Fig. 2, I have illustrated a novel manner of arranging the lamp circuits in the car. This is as follows: The wires $l$ and $l'$ are run underneath the car to the middle of the floor A. Then I branch out, as at $l^2$ and $l^3$ and run to the four corners of the car. By the wires $l^4$—$l^5$ and $l^6$—$l^7$, I establish complete circuits for the lamps L, into which circuits the current is fed in opposite directions from the four oppositely placed corners of the car. By this arrangement of wiring, all the lights will be of an equal intensity.

The general operation of the entire system is briefly as follows: When the car is at a standstill, the lights are fed from the one storage battery, while the several parts of the system may be in the positions shown in Figs. 1 and 2. When the dynamo begins to move and has acquired the desired speed, the make and break switch $e$ establishes contact and current is delivered to the other storage battery, the pole-changer operating as already explained to determine the direction of the current's flow. Previous to feeding the main circuit, the dynamo is rendered self-regulating in the manner as has been described. The automatic movement of the rheostat arm is accomplished by the small motor or rotary magnet H, the direction of rotation of its armature shaft, which operates said rheostat arm, being controlled by the double relay, which in turn is controlled by the volt meter or pressure regulator, and whereby the resistance is automatically cut in or cut out, as may be necessary. For example, say the dynamo is running at four hundred revolutions, giving an output in pressure of twenty-four volts. As soon as the armature exceeds four hundred revolutions, then the pressure regulator or volt meter acts upon the relay, the relay in turn acts upon the small motor or rotary magnet, and the result is that the current is weakened in the same proportion by the rheostat, that the armature has increased in speed; and vice versa, when the revolutions of the armature decrease, the second relay is cut in, due to the action of the volt meter, thereby reversing (changing the polarity) the direction of the revolutions of the small motor and cutting out the resistance coils in the rheostat proportionately. In this manner the dynamo is made self-regulating and a constant voltage or output of electro-motive force, irrespective of the speed, is fed into the main circuit, and to further overcome any possible variations or fluctuations, due perhaps to one of the devices acting too slowly or refusing to act, I have arranged two sets of storage batteries which are alternately fed from the dynamo and alternately feed the lamp circuit in the manner as has been fully stated and described in the above.

Of course it will be evident, that certain changes may be made in the arrangements and combinations of parts, and therefore I do not wish to be understood as limiting myself to such arrangements and combinations of parts as shown.

It will be readily understood that my invention is applicable not only to a car-wheel axle, but it is of utility when the dynamo is driven from other sources of variable speed power.

Having thus described my invention, what I claim is—

1. The combination with a working circuit and a lamp circuit containing lamps or other translating devices, of a pair of storage batteries, a dynamo, and a switch for connecting either one of said batteries, directly in circuit with the dynamo and the other of said batteries in circuit with said lamp circuit, said switch comprising therein a pivoted handle $m$, contact arms $m'$, $m'$ and $m^2$, $m^2$, and contacts $m^3$ and $m^4$, and $m^5$ and $m^6$ in the battery circuits, substantially as and for the purposes set forth.

2. The combination with a working circuit and a lamp circuit containing lamps or other translating devices, of a pair of storage batteries, a self-regulating dynamo, and a switch for connecting either one of said batteries directly in circuit with the dynamo and the other of said batteries directly in circuit with said lamp circuit, said switch comprising therein a pivoted handle $m$, contact arms $m'$, $m'$ and $m^2$, $m^2$, and contacts $m^3$ and $m^4$, and $m^5$ and $m^6$ in the battery circuits, substantially as and for the purposes set forth.

3. The combination, with the main circuit containing lamps or other translating devices, of a storage battery, and a self-regulating dynamo, circuits $d^4$ and $d^5$ connected with the main circuit, a volt meter or pressure regulator in said circuits $d^4$ and $d^5$, circuits $d^7$ and $d^8$ connected with the main circuit, and a relay G in said circuits $d^7$ and $d^8$, circuits $d^6$ and $d^9$ connecting said pressure regulator with said relay, and a rheostat H' in circuit with the dynamo, said devices being adapted to decrease the electro-motive force in the field coil of the dynamo, and thereby equalize the voltage of the dynamo in the main circuit, substantially as and for the purposes set forth.

4. The combination, with the main circuit containing lamps or other translating devices, of a storage battery, and a self-regulating dynamo, circuits $d^4$ and $d^5$ connected with the main circuit, a volt meter or pressure regulator in said circuits $d^4$ and $d^5$, circuits $d^7$ and $d^8$ connected with the main circuit, and a relay G in said circuits $d^7$ and $d^8$, circuits $d^6$ and $d^9$ connecting said pressure regulator with said relay, a rheostat H' in circuit with the dynamo, and a small motor H for automatically controlling the rheostat H', said devices being adapted to decrease the electro-motive force in the field coil of the dynamo, and thereby equalize the voltage of the dynamo in the main circuit, substantially as and for the purposes set forth.

5. The combination with a working circuit and a lamp circuit containing lamps or other translating devices, of a pair of storage batteries, a self-regulating dynamo, a reversible driving power, a pole-changer responsive to said reversing power, connected in circuit between the armature and said main circuit, and a switch for connecting either one of said batteries, directly in circuit with the dynamo, and the other of said batteries directly in circuit with said lamp circuit, said switch comprising therein a pivoted handle $m$, contact arms $m'$, $m'$, and $m^2$, $m^2$, and contacts $m^3$ and $m^4$, and $m^5$ and $m^6$ in the battery circuits, substantially as and for the purposes set forth.

6. The combination, on a railway car, of a dynamo pivotally mounted on the car-wheel axle and driven from said axle, a main circuit connected with said dynamo, containing lamps or other translating devices, a pair of storage batteries, and a switch for connecting either of said batteries directly in circuit with the dynamo, and the other of said batteries directly in circuit with said lamp circuit, and a pole-changer in circuit between the armature and main circuit, said switch comprising therein a pivoted handle $m$, contact arms $m'$, $m'$, and $m^2$, $m^2$, and contacts $m^3$ and $m^4$, and $m^5$ and $m^6$ in the battery circuits, substantially as and for the purposes set forth.

7. The combination, on a railway car, of a self-regulating dynamo pivotally mounted on the car-wheel axle and driven from said axle, a main circuit connected with said dynamo, containing lamps or other translating devices, a pair of storage batteries, and a switch for connecting either of said batteries directly in circuit with the dynamo, and the other of said batteries directly in circuit with said lamp circuit, and a pole-changer in circuit between the armature and main circuit, said switch comprising therein a pivoted handle $m$, contact arms $m'$, $m'$ and $m^2$, $m^2$, and contacts $m^3$ and $m^4$, and $m^5$ and $m^6$ in the battery circuits, substantially as and for the purposes set forth.

In testimony that I claim the invention set forth above I have hereunto set my hand this 26th day of March, 1894.

MORRIS MOSKOWITZ.

Witnesses:
  FREDK. C. FRAENTZEL,
  LEON D. ADLER.